(12) United States Patent
Atherton

(10) Patent No.: US 9,482,509 B2
(45) Date of Patent: Nov. 1, 2016

(54) ERGONOMIC MICROMETER INCLUDING TWO MODES OF ADJUSTMENT

(71) Applicant: Mitutoyo Corporation, Kawasaki-shi, Kanagawa-ken (JP)

(72) Inventor: Kim W. Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 196 days.

(21) Appl. No.: 14/568,947

(22) Filed: Dec. 12, 2014

(65) Prior Publication Data

US 2016/0169653 A1 Jun. 16, 2016

(51) Int. Cl.
- *G01B 3/18* (2006.01)
- *F16H 57/08* (2006.01)
- *F16H 25/00* (2006.01)
- *F16H 25/08* (2006.01)

(52) U.S. Cl.
CPC ................. *G01B 3/18* (2013.01); *F16H 25/00* (2013.01); *F16H 25/08* (2013.01); *F16H 57/08* (2013.01); *Y10T 74/18664* (2015.01)

(58) Field of Classification Search
CPC ... G01B 3/18; Y10T 74/18664; F16H 57/08; F16H 25/00; F16H 25/08
USPC .......... 33/281, 296, 374–376, 706–707, 712, 33/783–784, 787, 815–816, 823, 828, 33/831–833, 817
See application file for complete search history.

(56) References Cited

U.S. PATENT DOCUMENTS

| | | | |
|---|---|---|---|
| 718,266 A | 1/1903 | Marbach | |
| 809,272 A | 1/1906 | Starrett | |
| 1,132,704 A | * 3/1915 | Coes | G01B 3/18 33/819 |
| 1,405,295 A | 1/1922 | Cousins | |
| 2,709,305 A | * 5/1955 | Meyer | G01B 3/18 33/819 |
| 2,886,892 A | 5/1959 | Banfill | |
| 2,905,021 A | 9/1959 | Kuykendall | |
| 2,928,180 A | 3/1960 | Duke | |
| 3,114,976 A | 12/1963 | Räntsch | |
| 3,166,850 A | 1/1965 | Yamazawa | |
| 3,270,422 A | 9/1966 | Coope | |
| 3,673,896 A | 7/1972 | Vardaman | |
| 3,849,890 A | 11/1974 | Jeannet | |
| 3,932,956 A | 1/1976 | Young | |

(Continued)

FOREIGN PATENT DOCUMENTS

| | | |
|---|---|---|
| EP | 0 478 931 A1 | 4/1992 |
| EP | 0 644 397 A2 | 3/1995 |

*Primary Examiner* — R. A. Smith
*Assistant Examiner* — Tania Courson
(74) *Attorney, Agent, or Firm* — Christensen O'Connor Johnson Kindness PLLC

(57) ABSTRACT

A micrometer provides a quick adjustment mode and a fine adjustment mode. A spline-like rotary coupling configuration constrains the micrometer thimble and a threaded element to move together with respect to rotation, but does not constrain the position of the threaded element relative to the thimble along the measurement axis. A gear in the micrometer frame includes gear teeth that mesh with the threaded element and roll thereon along the measurement direction. A locking arrangement, when unlocked, allows the meshed gear to be rotated by a user to drive the threaded element along the measuring axis in the quick adjustment mode. When locked, the locking arrangement prevents motion of the gear to provide the fine adjustment mode, wherein the user rotates the thimble to screw the threaded element through the meshed teeth of the gear, to adjust the spindle position.

20 Claims, 3 Drawing Sheets

(56) References Cited

U.S. PATENT DOCUMENTS

| | | |
|---|---|---|
| 4,035,922 A | 7/1977 | von Voros |
| 4,062,120 A | 12/1977 | Lacagnina |
| 4,420,887 A * | 12/1983 | Sakata .................... G01B 3/18 33/794 |
| 4,443,945 A * | 4/1984 | Takemura ............... G01B 3/18 33/1 PT |
| 4,485,556 A | 12/1984 | Sakata |
| 4,553,330 A | 11/1985 | Yamauchi |
| 4,561,185 A | 12/1985 | Sakata |
| 4,878,880 A | 11/1989 | Williams |
| 5,000,721 A | 3/1991 | Williams |
| 5,390,571 A | 2/1995 | Fox, III |
| 5,404,975 A | 4/1995 | Michel |
| 5,495,677 A | 3/1996 | Tachikake |
| 5,605,071 A | 2/1997 | Buchanan, Jr. |
| 5,664,457 A | 9/1997 | Nejati |
| 5,829,155 A * | 11/1998 | Takahashi ............... G01B 3/18 33/813 |
| 6,041,671 A | 3/2000 | Erikson |
| 6,076,266 A | 6/2000 | Beckingham |
| 6,076,270 A | 6/2000 | Figliuzzi |
| 6,076,434 A | 6/2000 | Boukis |
| 6,196,894 B1 | 3/2001 | Kennedy |
| 6,247,244 B1 * | 6/2001 | Zanier .................... G01B 3/18 33/784 |
| 6,260,286 B1 * | 7/2001 | Suzuki .................... G01B 3/18 33/813 |
| 6,308,433 B1 | 10/2001 | Takahashi |
| 6,748,826 B2 | 6/2004 | Marks |
| 6,915,591 B2 * | 7/2005 | Hayashida ............... G01B 3/18 33/815 |
| 7,266,906 B2 | 9/2007 | Suzuki |
| 7,467,480 B2 | 12/2008 | Hayashida |
| 7,866,617 B2 | 1/2011 | Kleitsch |
| 8,091,251 B1 | 1/2012 | Zhang |
| 8,322,246 B2 | 12/2012 | Doelling |
| 8,739,428 B2 | 6/2014 | Emtman |
| 8,997,369 B2 | 4/2015 | Jones |
| D740,143 S * | 10/2015 | Asano ........................... D10/73 |
| 9,377,282 B2 * | 6/2016 | Dockrey ................ G01B 21/04 |
| 2005/0083707 A1 | 4/2005 | Burton |
| 2007/0026762 A1 | 2/2007 | McPhee |
| 2010/0083717 A1 | 4/2010 | Kitazumi |
| 2011/0247231 A1 | 10/2011 | Hayashida |
| 2012/0111993 A1 | 5/2012 | Dehart |
| 2013/0305858 A1 * | 11/2013 | Jones .................... G01B 3/18 74/89.34 |
| 2015/0059431 A1 * | 3/2015 | Lefebvre ............. G01B 21/042 73/1.79 |

* cited by examiner

ERGONOMIC MICROMETER INCLUDING TWO MODES OF ADJUSTMENT

FIELD

The present disclosure relates generally to handheld micrometers, and more specifically, a handheld micrometer with two modes of adjustment.

BACKGROUND

Various micrometer devices are known in the art for performing high precision measurements of workpieces using a handheld mechanism. For example, U.S. Pat. Nos. 1,132,704; 3,849,890; 4,485,556; 4,561,185; and 8,091,251 (referred to herein as the '704, '890, '556, '185 and '251 patents), each of which is hereby incorporated by reference in its entirety, disclose micrometer devices. In particular, modern micrometers such as that disclosed in U.S. Pat. No. 5,495,677 (the '677 patent) comprise a linear digital sensor for determining measurements, rather than relying on accurate micrometer threads in combination with a rotary position sensing device. Using a linear digital sensor eliminates the need to use an extremely accurate drive or fine pitch threads in order to drive the micrometer. For example, the '677 patent uses very coarse drive threads, and the '251 patent copies features of known spring-loaded gauge designs that use no drive threads.

The micrometer designs referred to above allow fast adjustment of the micrometer. However, they lack certain desirable features of traditional fine-pitch thread-driven micrometers. For example, traditional fine-pitch thread-driven micrometers allow for good ergonomic factors and feel for controlling very fine adjustments. One aspect of the ergonomic factors and feel is that such micrometers can be held and operated in one hand, while the other hand is free to hold the workpiece. In one common technique, the micrometer frame is gripped or hooked in two or three smaller fingers, with the thumb and index finger extended and used to turn the thimble. The fine pitch thread allows good control and stability of the adjustments in this position, whereas most "fast adjustment micrometer" designs such as those referenced above offer somewhat less certain control and/or stability. Another aspect of the ergonomic factors and feel associated with fine-pitch thread-driven micrometers is the inherent stiffness and/or stability of the spindle position, that allows a user to detect or adjust the amount of measuring force or contact on the workpiece surface by dragging or displacing the workpiece slightly in the measuring gap and sensing the amount of drag or "play" of the workpiece in the measuring gap. Users often gain confidence in a measurement setting in this manner, using subtle movements and tactile feedback, either consciously or unconsciously. Again, most "fast adjustment micrometer" designs such as those referenced above offer somewhat less stiffness, control and/or stability in this regard.

U.S. Pat. No. 809,272, discloses a quick adjustment micrometer that is adjustable in one conventional mode using a fine pitch thread in a split nut. The sections of the split nut are carried on, or formed on, deformable arms that can deflect or open radially to disengage the nut from the fine pitch thread, to allow a sliding "quick adjusting" mode wherein the threads slide axially through the open split nut, to quickly move the spindle. However, such a design offers poor adjustment control in the quick mode. Furthermore, its measurement position shifts when the split nut is locked onto a partially axially-misaligned thread. Furthermore, the user must exercise unusual care during operation, in that due to the variable separation between the split nut and the threads, the micrometer is subject to potential scraping and wear of the precision threads sliding on one another. Thus, in order to provide ergonomic, rapid, and convenient functionality for users, there remains a need for a micrometer that can be used to quickly drive a spindle to a desired position, and that also provides for a high stiffness fine adjustment mode that is easily operated and stable, and other desired features.

SUMMARY

The following summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is a micrometer drive configuration for a handheld micrometer than provides two alternative adjustment modes in an ergonomically favorable configuration. A fine adjustment mode provides a desirable level of engagement stiffness and/or measurement "feel", while a quick adjustment mode provides the ability to quickly drive the spindle to a desired position with limited motion and/or time on the part of the user. In various embodiments, the micrometer is configured such that either mode may be engaged or disengaged, and measurement adjustments can made in either mode with a single hand, without significantly altering the user's grip on the micrometer. In various embodiments, a micrometer according to the principles disclosed herein comprises a frame including an anvil; a spindle movable relative to the frame and anvil along its axis, wherein the spindle is guided to move parallel to an X axis direction; a threaded element having an axis parallel to the X axis direction, wherein the threaded element is coupled to move with the spindle with respect to motion along the X axis direction; a thimble having a rotation axis parallel to the X axis direction; a rotary coupling configuration that couples the thimble to the threaded element with respect to rotation; and a position indicator or sensor usable to determine a position of the spindle relative to the anvil or frame. The rotary coupling configuration is designed to constrain the thimble and the threaded element to move together with respect to rotation, but it does not constrain the position of the threaded element relative to the thimble with respect to motion along the X axis direction. For example, a spline shaft and spline nut or hub is one example of a rotary coupling that fits this description. However, this example is not limiting. Other rotary couplings that fit this functional description may also be used.

The micrometer further comprises a toothed element arrangement comprising at least a first toothed element arranged in the micrometer frame to rotate about a gear axis that is transverse to the X axis direction and including gear teeth arranged along an arc at a distance from the gear axis, wherein the gear teeth are formed to mesh with the threads of the threaded element and roll thereon along the X axis direction. The micrometer further comprises a locking arrangement configured to be unlocked to allow the first toothed element of the toothed element arrangement to drive the threaded element by rotating about its gear axis while meshed with the threads of the threaded element, to provide a quick adjustment state of the micrometer, and configured to be locked to lock a lockable toothed element of the toothed element arrangement that has teeth that mesh with the threads of the threaded element to prevent motion of the threaded element along the X axis direction relative to the frame unless the threaded element is rotated such that its threads advance through the meshed teeth of the locked lockable toothed element in the manner of a threaded shaft through a nut, to provide a fine adjustment state of the micrometer. The spindle may be advanced and retracted by rotating the first toothed element about the gear axis to drive the threaded element during the quick adjustment state, and the spindle may be advanced and retracted by rotating the thimble to screw the threads of the threaded element through the meshed teeth of the lockable toothed element during the fine adjustment state. In some embodiments, the lockable toothed element and the first toothed element are the same element.

In various embodiments, the rotary coupling comprises a female rotary drive portion coupled to one of the thimble and the threaded element, wherein the female rotary drive portion includes a central opening comprising a hole or bore having a hole cross section including a first mating rotary constraint feature, and a male rotary drive portion coupled to the other of the thimble and the threaded element, wherein the male rotary drive portion comprises a shaft that slides in or through the central opening of the female rotary drive portion. The shaft includes a second mating rotary constraint feature that is configured to interlock with the first mating rotary constraint feature such that they must rotate together, and to slide along or through the first mating rotary constraint feature along the X axis direction. In various embodiments, the threaded element has a hollow center that allows the shaft to pass into the interior of the threaded element. In at least one embodiment, the shaft may comprise a spline shaft and the female element may comprise a spline hub or nut fixed to the threaded element.

In some embodiments, the male or female rotary drive portion that is coupled to the thimble is coupled through a torque limiting clutch arrangement.

In various embodiments, a position indicator comprises an electronic linear position sensor. In some embodiments, the electronic linear position sensor includes a portion that is fixed relative to the frame and a portion that is coupled to move with the spindle with respect to motion along the X axis direction.

In some embodiments, a quick drive element is coupled to the first toothed element, the quick drive element configured to be operated by a user to rotate the first toothed element about the gear axis to drive the threaded element during the quick adjustment state. In some embodiments, the quick drive element is coupled to the first toothed element through a torque limiting clutch. In some embodiments, the first toothed element comprises a first circular gear and the quick drive element comprises a wheel accessible for rotation by a finger or thumb of the user.

In some embodiments, the locking arrangement comprises one of a button, slide, or lever that is operated by a user to move between an unlocked position to provide the quick adjustment state and a locked position to provide the fine adjustment state.

In some embodiments, the locking arrangement comprises an auto-lock mechanism that is coupled to the first toothed element, and configured to be actuated into the locked position when a spindle closing force is applied by a user through the quick drive element during the quick adjustment state and transmitted through the auto-lock mechanism to the first toothed element to move the spindle towards the anvil, and the spindle meets an object that provides a reaction force that is transmitted back through the first toothed element to oppose the closing force. In some embodiments, the auto-lock mechanism includes a compliant element that is deformed by the opposing closing and reaction forces to provide a deformed state of the auto-lock mechanism whereby it is actuated into the locked position to provide the fine adjustment state. In some embodiments, the locking arrangement may further comprise a release element that is operated by a user to release the auto-lock mechanism and restore the auto-lock mechanism to the unlocked position to provide the quick adjustment state.

In some embodiments, the micrometer includes a spindle anti-rotation configuration that prevents the spindle from rotating, and a rotary bearing coupling having a first portion that is coupled to a coupling portion of the non-rotating spindle and a second portion that is coupled to a coupling portion of the threaded element, wherein at least one of the first and second portions are coupled to their respective coupling portion, or to each other, through a rotary bearing that is preloaded to hold the spindle and threaded element at a fixed spacing along the X axis direction while allowing the threaded element to rotate.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
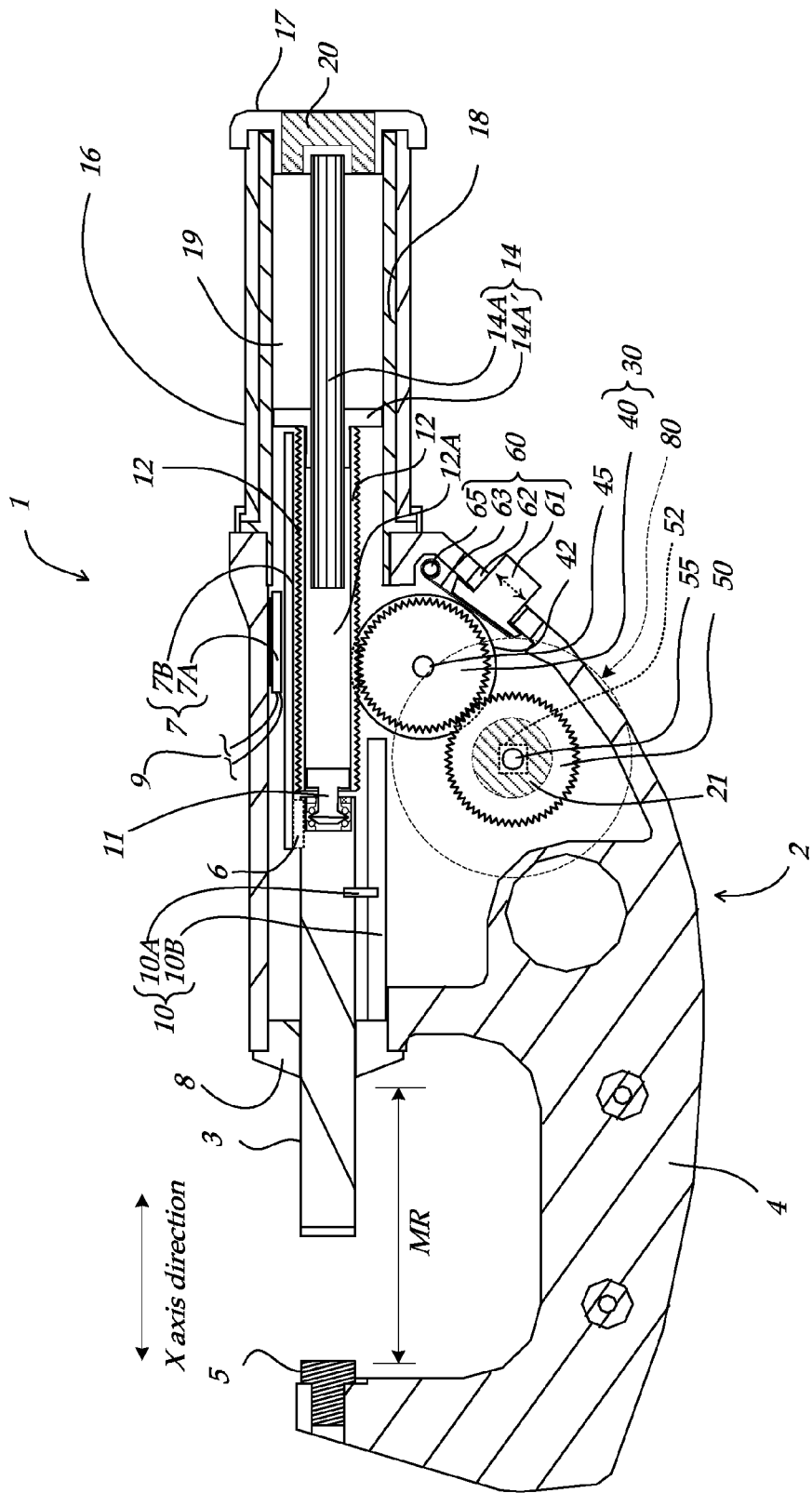
FIG. 1 is a cut away diagram including pertinent aspects of a first embodiment of a micrometer configured according to principles disclosed herein.

FIG. 1 is a cut away diagram including pertinent aspects of a first embodiment of a micrometer configured according to principles disclosed herein. Design and fabrication alternatives applicable to many conventional features of an electronic digital micrometer are known to one of ordinary skill in that art, as embodied in numerous patents and commercial devices. Therefore, details related to sensor, circuitry, digital display, cover, and operating buttons and the like, are omitted from the cut away diagram of FIG. 1, in order to more clearly illustrate the novel aspects therein. However, it will be understood that such omitted features may be included in various embodiments of the micrometer, as desired. For example, the micrometers of FIG. 1 or FIG. 2 may incorporate elements of the commonly assigned '677 patent, and/or other references incorporated or cited herein, or other elements and techniques known in the art, to the extent that such elements and techniques are compatible with the various principles disclosed herein. It will be appreciated that FIGS. 1 and 2 include a partially schematic representation of some of the illustrated elements.

FIG. 1 shows a digital micrometer gauge 1 that has a main frame 2. A cover member (not shown) may be provided on the front surface of the frame 2 to form a closed, water/dust-resistant structure for housing a battery and electronics connected to a readhead 7A of a position sensor 7 through schematically represented connections 9. A digital display and a plurality of operating switches (not shown) may be provided in the cover member and connected to the electronics. The electronics may comprise conventional circuits and processing, such as a CPU, and so on (not shown). The position sensor 7 may employ a scale 7B that is sensed by the readhead 7A to determined its position, for example as found in a photoelectric-type encoder such as disclosed in U.S. Pat. No. 5,026,164, or a capacitive or inductive-type encoder, or the like. A spindle 3 is adapted to advance from and retract into frame 2. A U-shaped portion 4 of the frame 2 defines an opening spanning a measuring range MR along a measuring axis direction, also designated as the X axis direction herein. An anvil 5 is disposed at one end of the opening as seen in FIG. 1. At the other end of the opening, a spindle 3 is supported in a sleeve or bearing 8 and guided such that it can be axially displaced. The exposed end of the spindle 3 is adapted to abut against the anvil 5 (e.g., at a zero measurement position of the spindle.) The other end of the spindle 3 is coupled to a threaded element 12.

In some embodiments, the spindle 3 is a non-rotating spindle that is coupled to the threaded element 12 through a rotary bearing coupling 11, described in greater detail below. In the non-rotating embodiment illustrated, the spindle is constrained by a spindle anti-rotation configuration 10, comprising a pin 10A in the spindle slides along a shoulder or groove 10B. More generally, any operable anti-rotation configuration may be used. FIG. 1 also illustrates the scale 7B mounted to move with the non-rotating spindle 3 through a mounting element 6. In other embodiments, the spindle may rotate and may be coupled rigidly to the threaded element 12, provided that a compatible position sensor and/or mounting arrangement is substituted for those illustrated, to allow the measurement position of the rotating spindle to be determined. In any case, the threaded element 12 is coupled to move with the spindle 3 with respect to motion along the X axis direction.

FIG. 1 further shows a thimble 16 having a rotation axis parallel to the X axis direction. The thimble 16 fits onto the outer periphery of an inner sleeve 18 to be circumferentially rotatable. One end of inner sleeve 18 is secured to the frame 2 and it includes a hollow center 19 into which the threaded element 12 may be retracted along with its attached components. A rotary coupling configuration 14 couples the thimble 16 to the threaded element 12 with respect to rotation. In particular, the rotary coupling configuration 14 is designed to constrain the thimble and the threaded element to move together with respect to rotation, but it does not constrain the position of the threaded element relative to the thimble with respect to motion along the X axis direction. This is one aspect of a combination of features that allow the micrometer 1 to provide two modes of adjustment, as indicated previously and described in greater detail below.

In the embodiment shown in FIG. 1, the rotary coupling configuration 14 comprises a mating spline shaft 14A and spline nut or hub 14A', which each include a mating interface that locks them together with respect to rotation, as is known for spline drive elements. The spline shaft 14A is coupled to rotate with the thimble 16. In the embodiment shown in FIG. 1, and the spline hub 14A' is coupled to the threaded element 12 to drive it in rotation, and can otherwise slide freely along the spline shaft 14A as is known for spline drive elements. The spline hub 14A' may also act as a sliding bearing and guide for the threaded element 12 and its attached components within the hollow center 19 of the inner sleeve 18. In various embodiments, the threaded element 12 may have a hollow center 12A such that it can retracted onto the spine shaft 14A without interference. It will be appreciated that the foregoing example of a rotary coupling configuration is exemplary only, and not limiting. Other rotary couplings that operate according the principles outlined in the functional description above, and/or as otherwise disclosed and claimed herein, may also be used. For example, a few of the many other potential rotary coupling examples are described below with reference to FIGS. 3A-3D.

In the embodiment shown in FIG. 1, the spline shaft 14A is coupled to the thimble 16 through an end cap 17. In one embodiment, the end cap 17 and/or thimble 16 may include a torque limiting clutch 20, schematically represented in FIG. 1 that couples the end cap 17 to the spline shaft 14A and/or the thimble 16, such that the torque that may be applied to the spline shaft 14A using the thimble 16 is limited. This may serve to avoid excessive stress on micrometer parts or provide a predictable measuring force when closing the micrometer using the thimble, or both. The schematic representation of the torque limiting clutch 20 is exemplary only and not limiting. Various usable torque limiting clutch designs are known in the art, for example as disclosed in the incorporated '677 patent.

The micrometer 1 further comprises a toothed element arrangement 30 that in the illustrated embodiment comprises a single toothed element 40 arranged in the frame 2. The toothed element 40 may rotate about a gear axis that is transverse to the X axis direction, on an axle 45 that is fixed to the frame 2. The toothed element 40 includes gear teeth that are formed to mesh with the threads of the threaded element and "roll" thereon along the X axis direction, in order to drive the threaded element 12 along the X axis direction during the quick adjustment mode of operation. The toothed element 40 is advantageously a circular gear in the illustrated embodiment. However, this example is not limiting. For example, an "arc segment" of a gear may be used in some alternative embodiments (although the operation of such embodiments may be less convenient for some combinations or sequences of switching between the quick adjustment and fine adjustment modes at various spindle positions.) Thus, more generally, in various embodiments a toothed element may be used that includes gear teeth arranged along an arc at a distance from the gear axis, provided that the gear teeth are formed to mesh with the threads of the threaded element and "roll" thereon along the X axis direction.

It will be understood that in order to mesh as described, it may be most advantageous for the gear teeth of a toothed element arrangement and/or the threads of a threaded element to be formed with complementary complex profiles in order to avoid the gear teeth clashing with the threads, while at the same time optimizing or maximizing the surface contact area as well as the feel of the gears, at each angle of engagement as the gear teeth rotate and "roll" on or drive the threads. Such profiles may be determined according to known gear design methods.

The micrometer 1 further comprises a locking arrangement 60 that in the illustrated embodiment comprises a wedge button 61 that slides in a slot 62. When the wedge button 61 is pushed in one direction (e.g., away from the thimble 16), it wedges a friction plate 63 that is mounted on an axle 65 against an outer surface 42 of the toothed element 40, to frictionally lock the toothed element 40 against rotation and provide the fine adjustment state or mode of the micrometer. The purpose of the friction plate 63 is to act as a "fixed" surface or buffer that prevents the motion of the wedge button 61 from causing rotation of toothed element 40.

From the foregoing description, it will be understood that in this embodiment the toothed element 40 acts as a lockable toothed element. It will be appreciated that when toothed element 40 is locked in this manner to provide the fine adjustment state or mode of the micrometer, its gear teeth remain meshed with the threads of the threaded element 12. Thus, it prevents motion of the threaded element 12 along the X axis direction during the fine adjustment mode, unless the threaded element is rotated such that its threads advance through the meshed teeth of the "locked" toothed element 40 in the manner of a threaded shaft through a nut.

Conversely, when the wedge button 61 is pushed in the other direction (e.g., toward from the thimble 16), it disengages from the friction plate 63 and releases it from frictional engagement against the outer surface 42 of the toothed element 40, to unlock the toothed element 40 such that it is free to be driven in rotation, and drive the threaded element 12 along the X axis direction to provide the quick adjustment state or mode of the micrometer as outlined above.

It will be understood that the illustrated embodiment of the locking arrangement 60 outlined above is exemplary only and not limiting. Numerous alternative embodiments and/or additional features may be used in a locking arrangement according to principles disclosed herein. More generally, in some embodiments, a manual-type locking arrangement may comprise one of a button, slide or lever, or the like, that is operated by a user to move between an unlocked position to provide a quick adjustment state or mode as outlined herein, and a locked position to provide the fine adjustment state or mode as outlined herein.

In some embodiments, the locking arrangement may comprise an auto-lock type mechanism that is coupled to the first toothed element. For example, the auto-lock mechanism may be configured to be actuated into the locked position when a spindle closing force is applied by a user through the quick drive element during the quick adjustment state and transmitted through the auto-lock mechanism to the first toothed element to move the spindle towards the anvil, and the spindle meets an object that provides a reaction force that is transmitted back through the first toothed element to oppose the closing force. In some embodiments, the auto-lock mechanism includes a compliant element that is deformed by a result of the opposing closing and reaction forces to provide a deformed state of the auto-lock mechanism whereby it is actuated into the locked position to provide the fine adjustment state. Elements and principles usable in such an auto-lock mechanism are known in the art and need not be described in detail here. For example, U.S. Pat. Nos. 8,322,246; 5,404,975; 2,905,021; U.S. Pre-Grant Publication No. 2012/0111993; and European Patent No. 0478931 all disclose elements and principles (e.g., gears, shafts, biasing springs, detent arrangements, pawls, and so on) that may be combined to fabricate a gear assembly, detents, and so on that operate as outlined above. In some embodiments, the locking arrangement may further comprise a release element that is operated by a user to release the auto-lock mechanism and restore the auto-lock mechanism to the unlocked position to provide the quick adjustment state.

In the embodiment shown in FIG. 1, the toothed element 40 is coupled to a quick drive element 80 schematically shown in dashed outline. The quick drive element is configured to be operated by a user to rotate the toothed element 40 about the gear axis to drive the threaded element 12 during the quick adjustment state. In this particular embodiment, the quick drive element 80 comprises a wheel accessible for rotation by a finger or thumb of the user. That is, it will be understood that the wheel of the quick drive element 80 is at least partially exposed for operation by a user outside the cover (not shown) and frame 2. In some embodiments, the entire face of the wheel is exposed so that a user may continuously turn the wheel more than 360 degrees in either direction with a circular motion of the end of their thumb in a peripheral zone of the wheel, wherein the wheel pivots continuously under their thumb.

In the particular embodiment shown in FIG. 1, the quick drive element 80 is coupled to the toothed element 40 through an intermediate gear 50 that rotates on an axle 55 that is fixed to the frame 2. The intermediate gear 50 may include an integral square hub 52 (shown in dashed outline) that may project through a hole or seal in the cover (not shown) of the micrometer 1, such that the quick drive element 80 may be mounted onto and drive the square hub to turn the gear 50 and the toothed element 40, in order drive the threaded element 12 along the X axis direction under user control during the quick adjustment mode of operation. It will be understood that an intermediate gear 50, and/or other coupling elements (e.g., additional or alternative gears, or belts, or the like) allow some flexibility for locating the quick drive element 80 in a particular desired ergonomic location relative to the toothed element 40, and/or providing a desired gear ratio between the two elements. However, in other embodiments, the intermediate gear 50 may be omitted and the toothed element 40 may be driven in a similar manner, while directly coupled to a differently located embodiment of the quick drive element 80. Thus, it will be understood that the illustrated method of coupling between the quick drive element 80 and the toothed element 40 is exemplary only, and not limiting.

In various embodiments, the quick drive element 80 may be coupled to the toothed element 40 through a torque limiting clutch 21, such that the torque that may be applied to the toothed element 40 using the quick drive element 80 is limited. This may serve to avoid excessive stress on micrometer parts or provide a predictable measuring force when closing the micrometer using the quick drive element 80, or both. The schematic representation of the torque limiting clutch 21 is exemplary only and not limiting. Of course, such a clutch may be provided in association with the toothed element 40 instead the gear 50, if desired. Various usable torque limiting clutch designs are known in the art, for example, as disclosed in the incorporated '677 patent or U.S. Pat. Nos. 4,878,880 or 5,000,721, which are hereby incorporated herein by reference in their entirety.

To summarize, as a result of the combination of elements and features outlined above in the micrometer 1, the rotary coupling configuration constrains the thimble and the threaded element to move together with respect to rotation, but does not constrain the position of the threaded element relative to the thimble with respect to motion along the X axis direction. The micrometer 1 comprises a toothed element arrangement 30 comprising at least a first toothed element 40 arranged in the frame 2 to rotate about a gear axis that is transverse to the X axis direction and including gear teeth arranged along an arc at a distance from the gear axis, wherein the gear teeth are formed to mesh with the threads of the threaded element 12 and roll thereon along the X axis direction. The micrometer 1 comprises a locking arrangement 60 configured to be unlocked to allow the first toothed element 40 of the toothed element arrangement 30 to drive the threaded element 12 by rotating about its gear axis while meshed with the threads of the threaded element 12, to provide a quick adjustment state of the micrometer 1. The locking arrangement 60 is further configured to be locked to fix a lockable toothed element 40 of the toothed element arrangement 30 that has teeth that mesh with the threads of the threaded element 12 to prevent motion of the threaded element 12 along the X axis direction relative to the frame 2, unless the threaded element 12 is rotated such that its threads advance through the meshed teeth of the locked lockable toothed element 40 in the manner of a threaded shaft through a nut, to provide a fine adjustment state of the micrometer 1. Accordingly, the spindle 3, which is coupled to the threaded element 12, may be advanced and retracted by rotating the first toothed element 40 about its gear axis to drive the threaded element 12 during the quick adjustment state, and the spindle may be advanced and retracted by rotating the thimble 16 to screw the threads of the threaded element 12 through the meshed teeth of the locked lockable toothed element 40 during the fine adjustment state.

Figure 2:
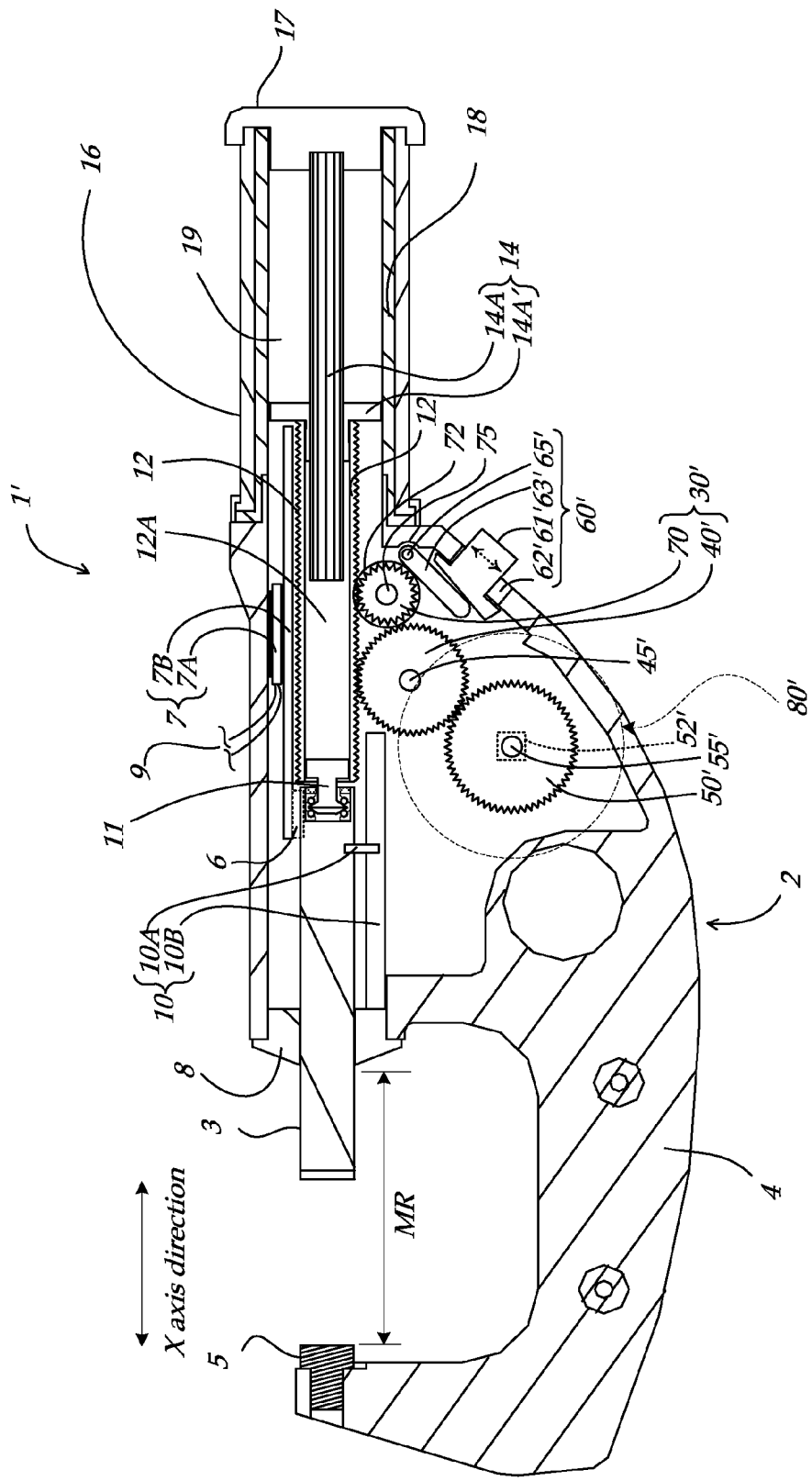
FIG. 2 is a cut away diagram including pertinent aspects of second embodiment of a micrometer configured according to principles disclosed herein.

FIG. 2 is a cut away diagram including pertinent aspects of second embodiment of a micrometer 1' configured according to principles disclosed herein. It will be understood that many of the elements of the micrometer 1' may be analogous or identical to elements previously described with reference to the micrometer 1 shown in FIG. 1. In many cases, elements numbered XX' in FIG. 2 may provide functions analogous to elements numbered XX in FIG. 1, and may be understood by analogy such that only significant differences are described herein.

In particular, the micrometer 1' differs from the micrometer 1 primarily with respect to the toothed element arrangement 30', which in the illustrated embodiment comprises a toothed element 40' and separate lockable toothed element 70, arranged in the frame 2. It will be understood that the toothed element 40' and the lockable toothed element do not mesh with one another (e.g., they have clearance from one another.) Similar to the toothed element 40, the toothed element 40' rotates on an axle 45' that is fixed to the frame 2, and includes gear teeth that are formed to mesh with the threads of the threaded element 12 and "roll" thereon along the X axis direction, in order to drive the threaded element 12 along the X axis direction during the quick adjustment mode of operation. The toothed element 40' is advantageously a circular gear in the illustrated embodiment.

The micrometer 1' further comprises a locking arrangement 60' that in this embodiment locks the lockable toothed element 70, instead of directly locking the toothed element 40'. The lockable toothed element 70 rotates on an axle 75 that is fixed to the frame 2, and includes gear teeth that are formed to mesh with the threads of the threaded element 12 and "roll" freely thereon along the X axis direction, in order to allow free motion of threaded element 12 along the X axis direction, except when the lockable toothed element 70 is locked by the locking arrangement 60'. The toothed element 70 is also advantageously a circular gear in the illustrated embodiment. However, it will be appreciated that this embodiment of the toothed element arrangement 30' is exemplary only and not limiting (e.g., as previously outlined with reference to the toothed element 40).

In the illustrated embodiment, the locking arrangement 60' comprises a wedge button 61' that slides in a slot 62'. When the wedge button 61' is pushed in one direction (e.g., toward from the thimble 16), it wedges a friction plate 63' that is mounted on an axle 65' against an outer surface 72 of the lockable toothed element 70, to frictionally lock the lockable toothed element 70 against rotation and provide the fine adjustment state or mode of the micrometer. The purpose of the friction plate 63' is to act as "fixed" surface or buffer that prevents the motion of the wedge button 61' from causing rotation of the lockable toothed element 70. It will be appreciated that when lockable toothed element 70 is locked in this manner to provide the fine adjustment state or mode of the micrometer, its gear teeth remain meshed with the threads of the threaded element 12. Thus, it prevents motion of the threaded element 12 along the X axis direction during the fine adjustment mode, unless the threaded element 12 is rotated such that its threads advance through the meshed teeth of the "locked" lockable toothed element 70 in the manner of a threaded shaft through a nut.

Conversely, when the wedge button 61' is pushed in the other direction (e.g., away from the thimble 16), it disengages from the friction plate 63' and releases it from frictional engagement against the outer surface 72 of the lockable toothed element 70, to unlock the lockable toothed element 70 such that it is free to be driven in rotation, allowing the toothed element 40' to drive the threaded element 12 along the X axis direction to provide the quick adjustment state or mode of the micrometer.

It will be understood that the illustrated embodiment of the locking arrangement 60' outlined above is exemplary only and not limiting. Numerous alternative embodiments and/or additional features may be used in a locking arrangement according to principles disclosed herein, as previously outlined with reference to the locking arrangement 60.

In the embodiment shown in FIG. 2, the toothed element 40' is coupled to a quick drive element 80' schematically shown in dashed outline. Similarly to the analogous features of FIG. 1, the quick drive element 80' is configured to be operated by a user to rotate the toothed element 40' about the gear axis to drive the threaded element 12 during the quick adjustment state. In the particular embodiment shown in FIG. 1, the quick drive element 80' is coupled to the toothed element 40' through an intermediate gear 50' that rotates on an axle 55' that is fixed to the frame 2. The intermediate gear 50' may include an integral square hub 52' (shown in dashed outline) that may project through a hole or seal in the cover (not shown) of the micrometer 1', such that the quick drive element 80' may be mounted onto and drive the square hub to turn the gear 50' and the toothed element 40', in order drive the threaded element 12 along the X axis direction under user control during the quick adjustment mode of operation. Similar to the previous discussion of the elements 80 and 40, it will be understood that the illustrated method of coupling between the quick drive element 80' and the toothed element 40' is exemplary only, and not limiting.

To summarize, as a result of the combination of elements and features outlined above, in the micrometer 1' the rotary coupling configuration constrains the thimble 16 and the threaded element 12 to move together with respect to rotation, but does not constrain the position of the threaded element 12 relative to the thimble 16 with respect to motion along the X axis direction. The micrometer 1' comprises a toothed element arrangement 30', comprising a first toothed element 40' and a lockable toothed element 70, each arranged in the frame 2 to rotate about gear axes that are transverse to the X axis direction and including gear teeth arranged along an arc at a distance from the gear axis. The gear teeth are formed to mesh with the threads of the threaded element 12 and roll thereon along the X axis direction.

The micrometer 1' comprises a locking arrangement 60' configured to be unlocked to allow the first toothed element 40' of the toothed element arrangement 30' to drive the threaded element 12 by rotating about its gear axis while meshed with the threads of the threaded element 12, to provide a quick adjustment state of the micrometer 1'. The locking arrangement 60' is further configured to be locked to fix the lockable toothed element 70 of the toothed element arrangement 30' that has teeth that mesh with the threads of the threaded element 12 to prevent motion of the threaded element 12 along the X axis direction relative to the frame 2, unless the threaded element 12 is rotated such that its threads advance through the meshed teeth of the locked lockable toothed element 70 in the manner of a threaded shaft through a nut, to provide a fine adjustment state of the micrometer 1'. Accordingly, the spindle 3, which is coupled to the threaded element 12, may be advanced and retracted by rotating the first toothed element 40' about its gear axis to drive the threaded element 12 during the quick adjustment state, and the spindle 3 may be advanced and retracted by rotating the thimble 16 to screw the threads of the threaded element 12 through the meshed teeth of the locked lockable toothed element 70 during the fine adjustment state.

FIGS. 3A-3D include respective cutaway diagrams and sections illustrating four alternative embodiments of a rotary coupling configuration for coupling a micrometer thimble 16 to a threaded element 12 according to principles disclosed herein. It will be understood that many of the elements of the FIGS. 3A-3D may be analogous or identical to elements previously described with reference to the micrometer 1 shown in FIG. 1. Elements similarly numbered in FIG. 1 and FIGS. 3A-3D may be similar or identical, and may be understood by analogy such that only significant differences are described herein.

In each of the four embodiments, the rotary coupling (14, 14', 14'', 14''') comprises a female rotary drive portion (14A', 14B', 14C' or 14D') coupled to one of the thimble 16 and the threaded element 12. The female rotary drive portion includes a central opening comprising a hole or bore having a hole cross section including a first mating rotary constraint feature (15A', 15B', 15C' or 15D'). A male rotary drive portion (14A, 14B, 14C or 14D) is coupled to the other of the thimble and the threaded element, wherein the male rotary drive portion comprises a shaft that slides in or through the central opening or hole of the female rotary drive portion. The shaft includes a second mating rotary constraint feature (15A, 15B, 15C or 15D) that is configured to interlock with the first mating rotary constraint feature (15A', 15B', 15C' or 15D') such that they must rotate together, and slide along or through the first mating rotary constraint feature (15A', 15B', 15C' or 15D') along the X axis direction. In the various embodiments, the threaded element 12 has a hollow center 12A that allows the shaft to enter into the interior of the threaded element 12.

Figure 3A:
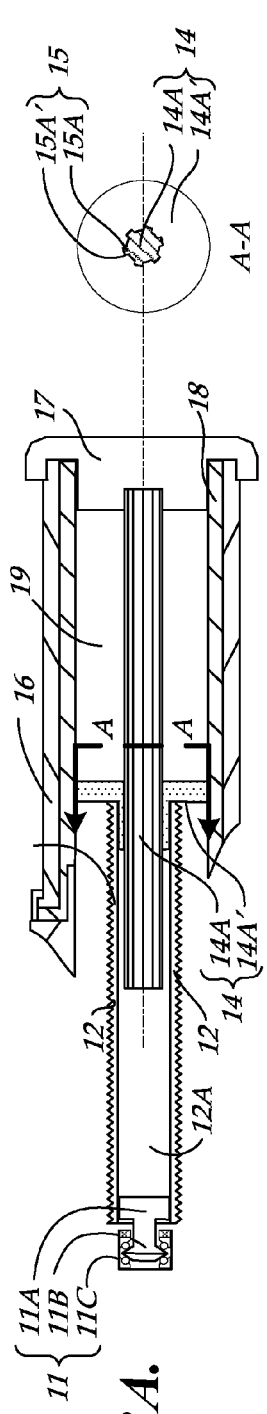
FIGS. 3A-3D include respective cutaway diagrams and sections illustrating four alternative embodiments of a rotary coupling configuration for coupling a micrometer thimble to a threaded element according to principles disclosed herein.

FIG. 3A shows the embodiment previously described with reference to FIG. 1. The male rotary drive portion 14A comprises a spline shaft coupled to the thimble 16 through the end cap 17, and the female rotary drive portion 14A' comprises a spline hub or nut fixed to the end of the threaded element 12. The spline nut provides the first mating rotary constraint feature 15A' in the form of a corrugated pattern outlining the hole in the female male rotary drive portion 14A'. The spline shaft provides the second mating rotary constraint feature 15A in the form of a matched fitting corrugated pattern outlining the cross section of the male rotary drive portion 14A.

Figure 3B:
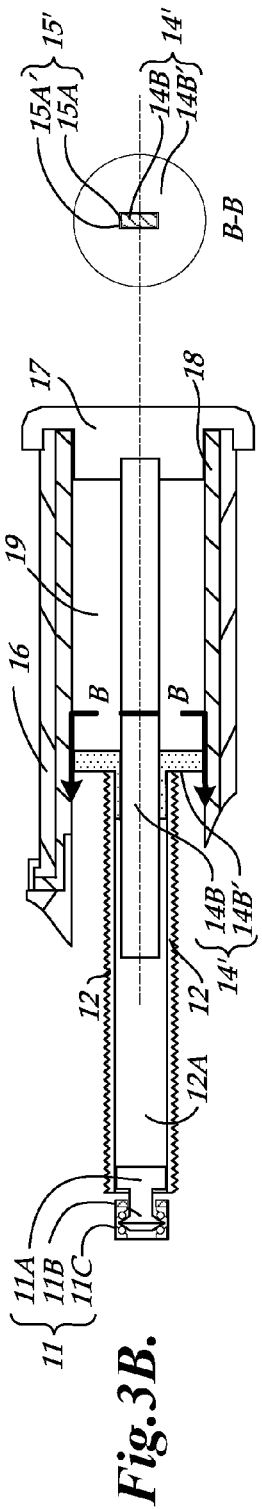

FIG. 3B shows an embodiment having simpler mating rotary constraint features. The male rotary drive portion 14B comprises a rectangular shaft coupled to the thimble 16 through the end cap 17 and the female rotary drive portion 14B' comprises a hub or plate fixed to the end of the threaded element 12. The hub or plate provides the first mating rotary constraint feature 15B' in the form of a rectangular pattern outlining the hole in the female male rotary drive portion 14B'. The rectangular shaft provides the second mating rotary constraint feature 15B in the form of a matched fitting rectangular shape of the cross section of the shaft of the male rotary drive portion 14B.

Figure 3C:
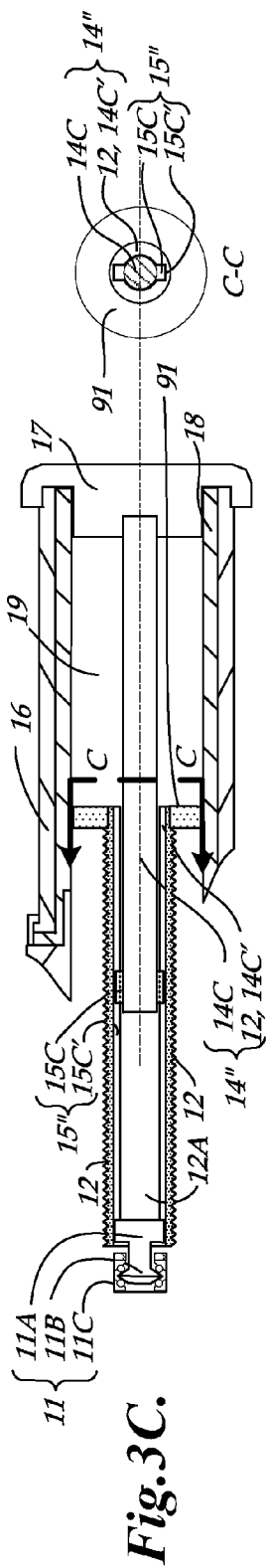

FIG. 3C shows an embodiment wherein the female male rotary drive portion 14C' comprises the interior of the threaded element 12. The interior of the threaded element 12 provides the first mating rotary constraint feature 15C' in the form of two opposing keyways or slots formed in its interior wall. The male rotary drive portion 14C comprises a round shaft coupled to the thimble 16 through the end cap 17. The round shaft provides the second mating rotary constraint feature 15C in the form of two matching fitted keys or tabs 15C attached to, or formed on, its periphery. The keys or tabs 15C fit into and slide in the keyways or slots in the interior wall of the threaded element 12. A sliding bearing 91 may support and guide the threaded element 12 and its attached components within the hollow center 19 of the inner sleeve 18.

Figure 3D:
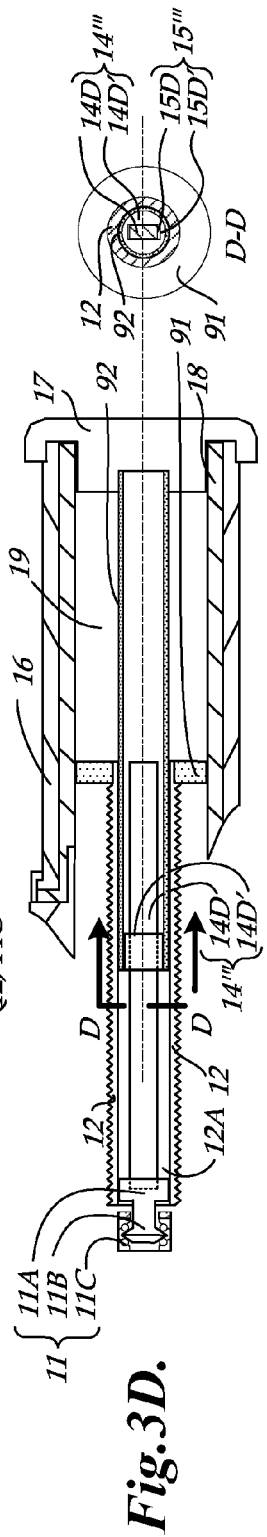

FIG. 3D shows another embodiment having simple mating rotary constraint features. The male rotary drive portion 14D comprises a rectangular shaft coupled to or embedded in the inside end or bottom of the interior hole 12A of the threaded element 12. Alternatively, the shaft may be coupled to or embedded in a portion of the rotary bearing coupling 11 that is coupled to or fastened at one end of the threaded element 12, as shown. The female rotary drive portion 14D' comprises a hub or plate coupled to the thimble 16 through a tube 92 fastened to the end cap 17, as shown. In the illustrated embodiment, the hub or plate is fastened at the inner end of the tube 92. The hub or plate provides the first mating rotary constraint feature 15D' in the form of a rectangular pattern outlining the hole in the female male rotary drive portion 14D'. The rectangular shaft provides the second mating rotary constraint feature 15D in the form of a matched fitting rectangular shape of the cross section of the shaft of the male rotary drive portion 14D. The tube 92 has a hollow center that allows the rectangular shaft to enter into the interior of the tube, and the threaded element 12 has a hollow center 12A that allows the tube 92 to enter into the interior of the threaded element 12.

As previously described with reference to FIG. 1, in some embodiments the micrometer includes a spindle anti-rotation configuration that prevents the spindle from rotating, and a rotary bearing coupling that joins the non-rotating spindle to the rotating threaded element. Each of the FIGS. 3A-3D show an embodiment of a rotary bearing coupling 11 also shown in FIGS. 1 and 2. The rotary bearing coupling 11 has a first portion 11B that is coupled to a coupling portion of the non-rotating spindle 3, as best seen in FIGS. 1 and 2, and a second portion 11A that is coupled to a coupling portion of the threaded element 12. In various embodiments, at least one of the first and second portions 11A or 11B are coupled to their respective coupling portions, or to each other, through a rotary bearing 11C that is preloaded to hold the spindle 3 and threaded element 12 at a fixed spacing along the X axis direction, while allowing the threaded element 12 to rotate. In the embodiment shown in FIGS. 3A-3D, the preloaded bearing captures the beveled portion 11B, and the outer races of the preloaded bearing is fastened to a recess in the spindle 3, as best seen in FIGS. 1 and 2. Various forms of preloaded bearing elements are known in the art, for example as disclosed in U.S. Pat. No. 4,553,330, which is hereby incorporated herein by reference in its entirety. The illustrated embodiment comprising ball bearings is exemplary only and not limiting. For example, in some embodiments the preloaded bearing may comprise a central ball, cone, or a pointed tip that is preloaded against and pivots on an abutting surface.

While various preferred embodiments of the invention have been illustrated and described, numerous variations in the illustrated and described arrangements and combinations of features and sequences of operations will be apparent to one skilled in the art based on this disclosure. For example, as previously indicated, in some embodiments the spindle may rotate and may be coupled rigidly to the threaded element 12, provided that a compatible position sensor and/or mounting arrangement is used to allow the measurement position of the rotating spindle to be determined. In such a case, the rotary bearing coupling may be omitted. It should be appreciated that in some such embodiments it is possible to couple the threaded element 12 to the thimble 16 through the spindle 3 (e.g., with suitable couple elements). In such embodiments, the threaded element need not be coupled to the thimble 16 through the end cap 17. Thus, it will be appreciated that this and various other changes can be made to the embodiments disclosed herein without departing from the spirit and scope of the invention.

The embodiments of the invention in which an exclusive property or privilege is claimed are defined as follows:

1. A micrometer comprising:
    a frame including an anvil;
    a spindle movable relative to the frame and anvil along its axis, guided to move parallel to an X axis direction;
    a threaded element having an axis parallel to the X axis direction, the threaded element coupled to move with the spindle with respect to motion along the X axis direction;
    a thimble having a rotation axis parallel to the X axis direction;
    a rotary coupling configuration that couples the thimble to the threaded element with respect to rotation; and
    a position indicator usable to determine a position of the spindle relative to the anvil or frame;
    wherein:
    the rotary coupling configuration constrains the thimble and the threaded element to move together with respect to rotation, but does not constrain the position of the threaded element relative to the thimble with respect to motion along the X axis direction;
    the micrometer further comprises a toothed element arrangement comprising at least a first toothed element arranged in the frame to rotate about a gear axis that is transverse to the X axis direction and including gear teeth arranged along an arc at a distance from the gear axis, the gear teeth formed to mesh with the threads of the threaded element and roll thereon along the X axis direction;
    the micrometer further comprises a locking arrangement configured to be unlocked to allow the first toothed element of the toothed element arrangement to drive the threaded element by rotating about its gear axis while meshed with the threads of the threaded element, to provide a quick adjustment state of the micrometer; and configured to be locked to fix a lockable toothed element of the toothed element arrangement that has teeth that mesh with the threads of the threaded element to prevent motion of the threaded element along the X axis direction relative to the frame unless the threaded element is rotated such that its threads advance through the meshed teeth of the locked lockable toothed element in the manner of a threaded shaft through a nut, to provide a fine adjustment state of the micrometer; and
    the spindle may be advanced and retracted by rotating the first toothed element about the gear axis to drive the threaded element during the quick adjustment state, and the spindle may be advanced and retracted by rotating the thimble to screw the threads of the threaded element through the meshed teeth of the locked lockable toothed element during the fine adjustment state.

2. The micrometer of claim 1, wherein the rotary coupling configuration comprises:
    a female rotary drive portion coupled to one of the thimble and the threaded element, the female rotary drive portion including a central opening comprising a hole or bore having a hole cross section including a first mating rotary constraint feature; and
    a male rotary drive portion coupled to the other of the thimble and the threaded element, the male rotary drive portion comprising a shaft that slides in or through the central opening of the female rotary drive portion, the shaft including a second mating rotary constraint feature that is configured to interlock with the first mating rotary constraint feature such that they must rotate together, and configured to slide along or through the first mating rotary constraint feature along the X axis direction.

3. The micrometer of claim 2, wherein the shaft has a dimension along the X axis direction that is at least as large as a maximum measuring range of the micrometer.

4. The micrometer of claim 3, wherein the male rotary drive portion is coupled to the thimble, and the threaded element has a hollow center that allows the shaft to pass into the interior of the threaded element.

5. The micrometer of claim 4, wherein the second mating rotary constraint feature extends along the shaft over a dimension along the X axis direction that is at least as large as the maximum measuring range of the micrometer, and the female rotary drive portion comprises a hub attached to the threaded element.

6. The micrometer of claim 2, wherein the male or female rotary drive portion that is coupled to the thimble is coupled through a torque limiting clutch arrangement.

7. The micrometer of claim 2, wherein the female rotary drive portion is formed in the threaded element by forming the first mating rotary constraint feature in a bore inside the threaded element.

8. The micrometer of claim 1, wherein the lockable toothed element and the first toothed element are the same element.

9. The micrometer of claim 1, wherein the position indicator comprises an electronic linear position sensor.

10. The micrometer of claim 9, wherein the electronic linear position sensor includes a portion that is fixed relative to the frame and a portion that is coupled to move with the spindle with respect to motion along the X axis direction.

11. The micrometer of claim 1, wherein the locking arrangement comprises one of a button, slide or lever that is operated by a user to move between an unlocked position to provide the quick adjustment state and a locked position to provide the fine adjustment state.

12. The micrometer of claim 11, wherein the locking arrangement includes a tapered element that is wedged against a surface that frictionally locks the lockable tooth element against rotation when the user to moves the button, slide or lever to the locked position.

13. The micrometer of claim 1, further comprising a quick drive element coupled to the first toothed element, wherein the quick drive element is configured to be operated by a user to rotate the first toothed element about the gear axis to drive the threaded element during the quick adjustment state.

14. The micrometer of claim 13, wherein the quick drive element is coupled to the first toothed element through a torque limiting clutch.

15. The micrometer of claim 13, wherein the first toothed element comprises a first circular gear and the quick drive element comprises a wheel accessible for rotation by a finger or thumb of the user.

16. The micrometer of claim 15, wherein the quick drive element is coupled to the first toothed element through a second circular gear.

17. The micrometer of claim 15, wherein the locking arrangement comprises an auto-lock mechanism that is coupled to the first toothed element, and configured to be actuated into the locked position when a spindle closing force is applied by a user through a quick drive element during the quick adjustment state and transmitted through the auto-lock mechanism to the first toothed element to move the spindle towards the anvil, and the spindle meets an object that provides a reaction force that is transmitted back through the first toothed element to oppose the closing force, and the auto-lock mechanism includes a compliant element that is deformed by the opposing closing and reaction forces to provide a deformed state of the auto-lock mechanism whereby it is actuated into the locked position to provide the fine adjustment state.

18. The micrometer of claim 17, wherein the locking arrangement further comprises a release element that is operated by a user to release the auto-lock mechanism and restore the auto-lock mechanism to the unlocked position to provide the quick adjustment state.

19. The micrometer of claim 18, wherein the release element includes the quick drive element, and the auto-lock mechanism is configured such that when a spindle opening force is applied to the quick drive element by the user during the fine adjustment state, the spindle opening force is coupled to the auto-lock mechanism to restore the auto-lock mechanism to the unlocked position.

20. The micrometer of claim 1, comprising:
a spindle anti-rotation configuration that prevents the spindle from rotating; and
a rotary bearing coupling having a first portion that is coupled to a coupling portion of the non-rotating spindle and a second portion that is coupled to a coupling portion of the threaded element, wherein at least one of the first and second portions are coupled to their respective coupling portion or to each other through a rotary bearing that is preloaded to hold the spindle and threaded element at a fixed spacing along the X axis direction while allowing the threaded element to rotate.

* * * * *